(12) United States Patent
Hopkins

(10) Patent No.: US 7,460,486 B2
(45) Date of Patent: *Dec. 2, 2008

(54) METHOD FOR TIME-STAMPING A MESSAGE BASED ON A RECIPIENT LOCATION

(75) Inventor: Oliver Mason Hopkins, Redmond, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 263 days.

This patent is subject to a terminal disclaimer.

(21) Appl. No.: 11/223,761

(22) Filed: Sep. 12, 2005

(65) Prior Publication Data

US 2006/0120299 A1 Jun. 8, 2006

Related U.S. Application Data

(63) Continuation of application No. 09/825,894, filed on Apr. 5, 2001, now Pat. No. 6,950,403, which is a continuation of application No. 08/868,401, filed on Jun. 3, 1997, now Pat. No. 6,239,719.

(51) Int. Cl.
*G01R 31/08* (2006.01)
(52) U.S. Cl. .................. 370/252; 340/7.51
(58) Field of Classification Search ............ None
See application file for complete search history.

(56) References Cited

U.S. PATENT DOCUMENTS 5,835,061 A * 11/1998 Stewart ............... 342/457
6,239,719 B1 * 5/2001 Hopkins ............. 340/7.51
6,950,403 B2 * 9/2005 Hopkins ............... 370/252

* cited by examiner

*Primary Examiner*—Robert W Wilson
(74) *Attorney, Agent, or Firm*—Kenyon & Kenyon LLP

(57) ABSTRACT

A method time-stamps an electronic message in accordance with information about the time zone in which the intended recipient resides where the message is originally received by a message center in a time zone different from the intended recipient.

5 Claims, 2 Drawing Sheets

| PIN | MIN |
|---|---|
| ABCDEF | XXX XXX XXXX |
| ⋮ | ⋮ |

| NPA-NXX | HLR |
|---|---|
| ⋮ | ⋮ |

| MSC | TIME ZONE |
|---|---|
| ⋮ | ⋮ |

| MESSAGE ||
|---|---|
| TIMESTAMP | ZONE |
| ⋮ | ⋮ |

METHOD FOR TIME-STAMPING A MESSAGE BASED ON A RECIPIENT LOCATION

This is a continuation of application Ser. No. 09/825,894 filed 5 Apr. 2001, now U.S. Pat. No. 6,950,403 B2, which is a continuation of application Ser. No. 08/868,401 filed 3 Jun. 1997, U.S. Pat. No. 6,239,719, the contents of each being incorporated herein by reference.

BACKGROUND OF THE INVENTION

The present invention is directed to a method for time-stamping a message based on the location of the message recipient. More particularly, the present invention is directed to a method for determining the location of an intended message recipient and adjusting a received time-stamp to reflect a time associated with the location at which the intended recipient is located.

It is known to provide message services in communication systems. An example of one such message service is referred to as the short message service (SMS) available on the PCS cellular network operating under the IS-136 protocol (TIA/EIA/IS-136.1-A October, 1996; TIA/EIA/IS-136.2 October 1996). In such a network the cellular subscriber can receive data packets containing messages wherever the cellular subscriber is located. The IS-136 standard states that the message transmitted to the subscriber should include some time-stamp indicating when the message was received. However, there is no indication in the standard that the time-stamp should at all be correlated to the time zone where the cellular subscriber is located when he or she receives the message. The message could be time-stamped in accordance with the time zone in which the message is first received for distribution to the cellular subscriber. This could create confusion for the intended recipient when the message is sent out in relation to the present time for the subscriber. For instance, assume the message center is in one time zone, e.g., Pacific Standard, and the message is received at 1 p.m. in that time zone. Further assume that the cellular subscriber is in a second time zone, one hour ahead of the first time zone (Mountain Standard). Thus, the message was received at the message center at 2 p.m. Mountain time. If the message is delivered to the cellular subscriber at 2:15 p.m. in the second time zone but shows a message time-stamp of 1 p.m., reflecting the first time zone, then the cellular subscriber is confused as to when the message was actually received at the message center. It would be beneficial if this confusion could be avoided.

SUMMARY OF THE INVENTION

The present invention avoids the confusion that can arise when a message is received in a message center in a time zone different from that of the intended message recipient. In accordance with an embodiment of the present invention a message center receives and notes the time of receipt at the message center in accordance with the time zone in which the message center is located. The message center then determines the location of the intended message recipient. The message center determines the time zone of that location and translates the received time into the time zone of the intended recipient.

In an embodiment in the communications area, a message center receives a message and a recipient identifier. The message center translates the identifier into a mobile identification number. The mobile identification number is then used to query a home location register to determine the location of the mobile switching center servicing the subscriber. Once the mobile switching center is determined, its location can be derived from a database. This location will have an associated time zone in which the mobile switching center is located. The time that the message center received the message will be translated to the time zone for the mobile switching center. As a result, the cellular subscriber using that switching center will receive an indication of the received time of the message in terms of the time zone corresponding to the location at which the subscriber is located.

DETAILED DESCRIPTION

Figure 1:
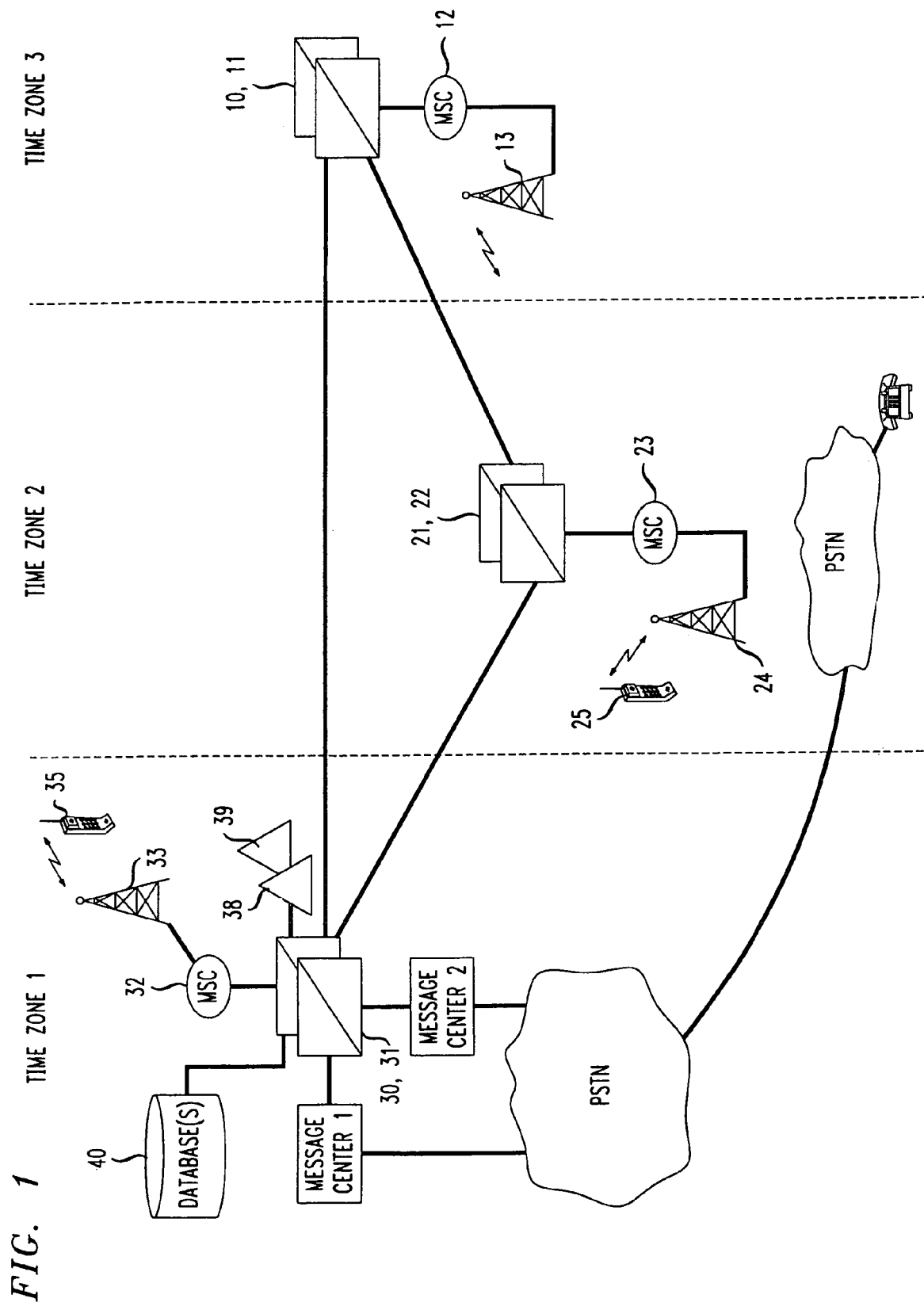
FIG. 1 illustrates in block schematic form a configuration implementing an embodiment of the present invention.

FIG. 1 illustrates a schematic representation of a system in which the present invention could be implemented. In particular, FIG. 1 illustrates a representation of three time zones in which different portions of a wireless communication network can be located. In Time Zone 3 there are signal transfer points (STPs) 10 and 11. (A single transfer point could be provided, however, transfer points may be assigned in pairs to provide back-up.) A mobile switching center (MSC) 12 is coupled to the signal transfer points. A cell site 13 is coupled to the MSC. The cell site then communicates over-the-air with mobile stations in the cell covered by that cell site. STPs 21 and 22 are located in Time Zone 2 and are connected to MSC 23. MSC 23 is connected to cell site 24. In Time Zone 2, a wireless phone is shown as element 25. The cellular network further includes, in Time Zone 1, STPs 30 and 31 connected to MSC 32, which is in turn connected to cell site 33. That cell site can be in communication with a mobile device such as device 35. The STPs 30, 31 are coupled to home location registers (38, 39). These HLRs store information related to mobile stations whose home region is the region serviced by these STPs. An HLR keeps track of the location of a mobile station as it moves throughout the cellular network. For instance, if hand-held device 25 has a home region in Time Zone 1 and which is serviced by STPs 30, 31 then information regarding device 25 is maintained in HLRs 38 and 39. These HLRs would store information noting that the device 25 is presently being serviced by MSC 23.

Figures 2, 3, 4, 5, 6:
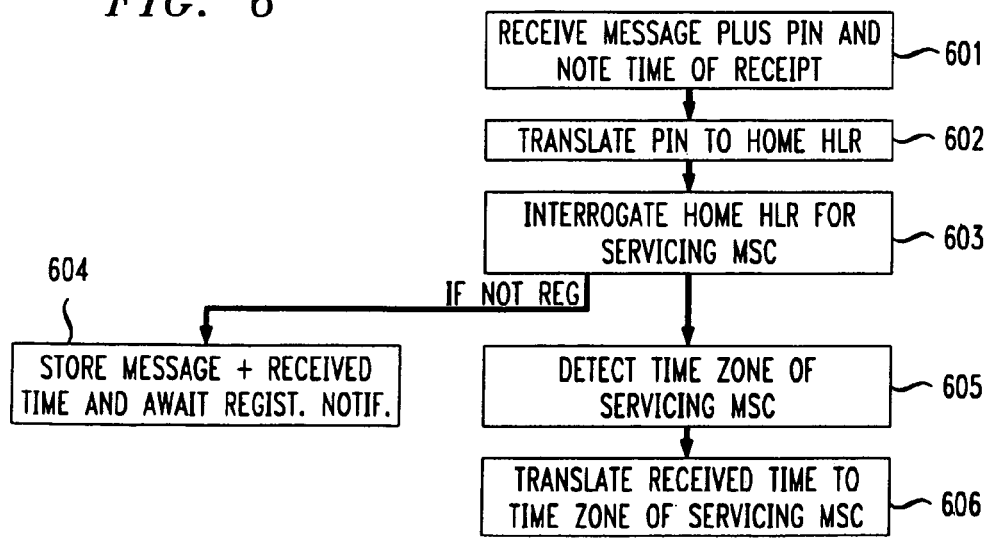
FIG. 2 illustrates an embodiment of a database correlating message recipients and mobile stations.
FIG. 3 illustrates an embodiment of entries in a database correlating portions of mobile station identifiers and home location registers.
FIG. 4 illustrates an embodiment of entries in a database correlating the location of switches servicing cellular subscribers and the time zone of each switch.
FIG. 5 illustrates an embodiment of contents of a message transmitted from a message center to a subscriber in accordance with the present invention.
FIG. 6 provides a flow chart describing an embodiment of a method for time-stamping a message in accordance with the present invention.

In accordance with an embodiment of a message center configuration in accordance with the present invention a message sender could send a message to message center 1 or 2 over any of a number of communication networks. One exemplative network is shown as the public switch telephone network (PSTN) in FIG. 1. The message sender would send a message to the message center with an identifier of the intended recipient. The message center, via the STPs 30, 31 interrogates database(s) 40 to ascertain a mobile identification number (MIN) that corresponds to the recipient identifier received along with the message. An example of an entry in such a database is shown in FIG. 2 where a personal identification number (PIN) sent as a recipient identifier by the message sender is correlated with a mobile identification number (MIN). Once the MIN is known, the message center can interrogate another database to determine the HLR or home location register associated with that mobile station. This database is referred to as a global title translation database. An example of an entry in such a translation database is shown in FIG. 3. The message center then takes the HLR information and generates a query to the HLR servicing the intended recipient of the message. The HLR sends back information about the identity of the MSC with which the mobile station last registered and indicates the status of the registration that is, whether the subscriber is presently registered with that MSC. If the message center receives notification that the mobile station is presently registered with the MSC then the message center interrogates yet another database to correlate the identified servicing MSC with the time zone of the location in which that MSC is positioned. An example of an entry in such a database is illustrated in FIG. 4. Once the time zone of the MSC is determined, the message center then can translate the time at which it received the message in its own time zone to the time zone of the MSC which is presently serving the mobile station. This translation could be effected by knowing a time offset between the time zone of the message center and the time zone of the MSC with which the mobile station is registered. The message is then assembled and includes not only the message but a time-stamp which reflects the time that the message was received by the message center in terms of the time zone in which the intended recipient is located. An example of such a message is illustrated in FIG. 5.

A flow chart illustrating an embodiment of a process for creating the message time-stamp is set forth in FIG. 6. This process is consistent with the operation described above and it is described below for sake of clarity.

A message center receives a message plus an intended recipient identifier which could be constituted by a personal identification number (PIN), step 601. The message center also notes the time it receives the message in relation to the time zone of the message center. The message center then translates the PIN to a MIN and hence to the home location register (HLR) of the intended recipient, (step 602). The message center then interrogates the home HLR to determine the MSC that was last registered as serving the intended recipient, step 603. If, however, the HLR indicates that the recipient is not presently registered then the message center simply stores the message and the received time and awaits registration notification, step 604. Once the HLR is notified by a servicing MSC that the recipient is registered, the HLR sends a registration notification to the message center and then the message center proceeds to process the information just as if the recipient had been registered at the time the message center received the message. Thus, it proceeds to step 605 where the message center takes the information about the location of the servicing MSC and detects the time zone of that MSC. The message center then translates the received time to the time zone of the servicing MSC, step 606. Finally, the message is transmitted to the intended recipient.

The present invention therefore provides the intended recipient with a more useful indication of the time that the message was received. It notes the time that the message was received and determines how to translate that time to reflect the movement of the cellular subscriber receiving the message. This avoids the confusion which might arise in other attempts to implement the IS-136 standard.

While the present invention is described in connection with a mobile communications configuration, it is equally applicable to those messaging services where a message center or central depository of messages is likely to be in a time zone different than a substantial number of intended message recipients. The message center could keep a database identifying the locations of the intended recipients and would then translate a time-stamp that reflects information about the time zone in which the intended recipient is located.

What is claimed is:

1. A method for time-stamping a message from a sender to a mobile device, comprising:
   receiving a message including an identifier of an intended recipient at a first time;
   locating a mobile device identifier corresponding to the identifier of the intended recipient;
   determining a time zone of a mobile switching center with which a mobile device corresponding to the mobile device identifier is registered;
   translating the first time into a second time corresponding to the time zone of the mobile switching center with which the mobile device is registered; and
   forwarding the received message with a time stamp including the second time to the intended recipient.

2. The method of claim 1, the determining further comprises:
   querying a database using information corresponding to the mobile device identifier to identify the mobile switching center with which the mobile device is registered.

3. The method of claim 2, the determining further comprises:
   querying another database using information corresponding to the identified mobile switching center to identify the time zone of the identified mobile switching center.

4. The method of claim 1, the receiving further comprises:
   receiving the message at a message center.

5. The method of claim 1, wherein a personal identification number is sent as the identifier of the intended recipient.

* * * * *